Patented Oct. 26, 1926.

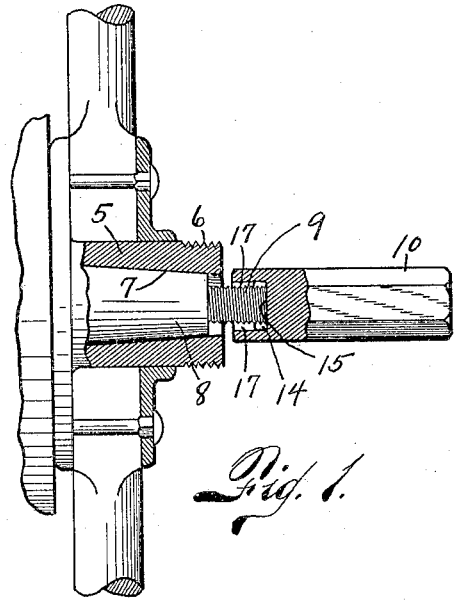
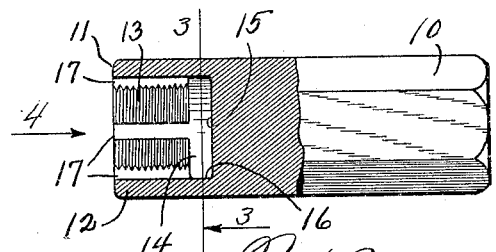
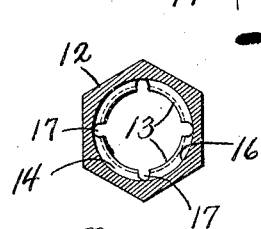 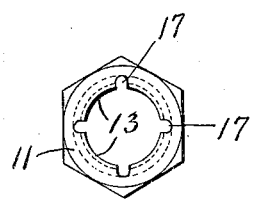

1,604,454

UNITED STATES PATENT OFFICE.

DANIEL S. LAMBERT AND CRANSTON B. RADER, OF DENVER, COLORADO.

COMBINED WHEEL-REMOVER AND THREAD-TRUING TOOL.

Application filed August 30, 1924. Serial No. 735,184.

This invention embodies a combined wheel remover and thread truing tool, as an article of manufacture preferably formed as a unitary or one-piece construction, and involves improvements in that class of tools, commercially designated as wheel pullers, which function to assist in the removal of a wheel from its axle arm, where the bore of the wheel hub is tapered to fit a tapered axle arm to which it is longitudinally keyed, it being understood that where a wheel is so mounted as to rotate with its axle, especially in the case of automobile wheels, it is more or less of a task to remove the wheel when requisite.

It has heretofore been proposed to employ a special form of improved wheel removing tool that is peculiarly adapted for direct attachment to the threaded axle end, independently of the wheel hub which is also externally threaded to receive a housing or dust cap, the said improved tool, in addition to having numerous advantages, functioning also to avoid the marring of the threads of the wheel hub, which latter frequently occurs in using types of wheel pullers screwed thereon, while likewise avoiding the marring of the threaded axle end, when, during the wheel removing operations, the tool is jarred with endwise tapping blows, for starting the axle arm, to relieve the frictional binding between the axle arm and its encasing wheel hub.

Such a type of improved tool is disclosed in our Patent No. 1,502,103 of July 22, 1924, and is also generally disclosed herein as supplemented by improved coacting features, essentially consisting of a hardened metal hand gripping stock or shank that is formed with a partially threaded cylindrical end socket, the inner end portion of which socket provides a rearwardly located annularly smooth-surfaced recess disposed behind a forward internally threaded portion of the socket, and the socket being sufficiently shallow to cause the extremity of the axle end to project against the rear wall of the socket, in abutting relation thereto, with the adjacent end of the tool maintained substantially spaced from the hub of the wheel, to be entirely out of contact therewith.

However, it nevertheless happens that, before employing either the aforesaid or the present improved type of such tool, the threads of the axle end frequently become broken or upset and distorted, as for instance by the nut jamming thereon in previous operations or from other causes, and the primary object of the present invention has been to devise means for rehabilitating or truing up any broken, upset, distorted or marred threads, during the application of the present improved tool, and cleaning out detached fragments thereof, during the withdrawal of the tool, whereby the threaded axle end is properly reformed for the facile reattachment of the nut, thus providing for even a more efficient tool and one which will be more economical in use, functioning as it does as a single tool, with coactively combined elements, to perform the dual desired aims of truing the axle end threads concurrently with the wheel removing operations, which heretofore it has been necessary to accomplish in separate and distinct operations.

Having thus generally outlined the nature, objects and advantages of the invention, reference will now be immediately had to the accompanying drawings, illustrating a practical embodiment of the improvements, in which drawings—

Figure 1 is a fragmentary view of a wheel hub in radial section as associated with its axle arm, and showing the improved tool, partially in section and elevation, operatively associated with the threaded axle end; Figure 2 is an enlarged view of the tool by itself, of approximately its practical dimensions, and substantially similar to the showing of the tool itself at Figure 1, the socketed end thereof being shown in longitudinal section; Figure 3 is a cross-sectional view taken along the line 3—3 of Figure 2, through the rear annular recess and looking towards the threaded portion of the socket; and Figure 4 is an end view of the socketed end of the tool, as indicated by the arrow 4 of Figure 2.

At Figure 1, the numeral 5 designates a wheel hub which provides the usual external threads 6, for the attachment of the dust or finishing hub cap, and the tapering bore 7 for the reception of the tapering axle arm 8, which latter terminates in the threaded axle end 9, for the attachment of the usual securing nut, it being also understood that provision is made for the longitudinal keying of the hub to the axle arm.

As in our former patent, before referred to, we still employ a hard metal elongated hand gripping stock or shank 10, which is shown as hexagonal although it may be of any other suitable contour in cross-section and may have a milled surface, if desired, both for ornamental finish and gripping purposes, the said shank or stock being formed with an end socket, to fit over the axle end 9, and the said socket being sufficiently shallow so that the adjacent end of the tool, when applied to the axle end, will be maintained substantially spaced from the hub of the wheel, as appears from Figure 1. The numeral 11 designates the face of the socketed end, while 12 indicates its peripheral wall as distinguished from the solid shank portion 10, and the socket itself is formed by a threaded bore 13 terminating in or merging into a rearwardly located annularly smooth-surfaced chamber or recess 14, the rear wall 15 of which may be flat-surfaced, although not essentially so, to uniformly contact the extremity or end face of the axle end 9. The forming of this rear end chamber or annular recess 14 enables the threading of the bore 13 clear up to the position where it merges into the annular recess 14, which latter may then receive the axle end projected therein and with its end face abutting snugly up against the rear wall surface 15, whereby mutilation of the threads of the axle end is entirely eliminated, when endwise tapping blows are delivered to the tool. As thus far stated, in the immediately foregoing description, the construction of the tool may be substantially the same as that disclosed in our former patent aforesaid, and likewise it functions in the same manner as our former device, when considering its use merely as a wheel removing tool.

In the instant construction, however, the diameter of the peripheral surface 16, of the annular chamber or recess 14, is preferably greater than the larger diameter of the threaded portion 13 of the socket, and by our present improvements we provide said threaded portion with one or more longitudinal grooves or channels 17, extending transversely of the threads for the entire length of said threaded portion.

Although, obviously, the number may be greater or less than illustrated, we have in the drawings actually shown a series of four of these grooves or channels 17, disposed in diametrically opposed paired relation and dividing the said threaded portion into quadrant sections, being also illustrated as of an approximate depth, greater than the depth of said threads, to have their bottom surfaces substantially in line with the peripheral wall surface 16 of the chamber 14, with which latter they are in direct open communication at their rear ends, while at their forward ends they open out through the end face 11 of the tool.

As viewed from Figure 1 specially, it will be seen that when the tool is properly applied to the axle end 9, the present improved device will function in the same satisfactory manner as the device disclosed in our prior patent aforesaid, in so far as the actual operations of wheel removing are concerned, that is to say the tool not only has no connection or contact with the wheel hub, or its threads 6, but also it is apparent that the rear wall portion of the socket snugly engages the axle end, so that by tapping on the outer end face of the tool stock the axle is driven away from the wheel hub, instead of the wheel hub being drawn off of the axle arm, and there can be no stripping or other mutilation of the threads of the axle end, owing to the engagement of the rear wall surface of the socket of the tool with the extremity or end face of the axle end. After the axle arm has been started, to relieve the frictional binding between it and its encompassing hub, the tool is then screwed off the axle end to permit of the removal of the wheel.

In addition to the foregoing, however, as to which no claim is made herein of itself, it is particularly to be emphasized, as the real gist of the instant improvements, that as the present improved tool is being applied, by screwing it home on the axle end 9, the coactively combined structure is such that any mutilated threads of the axle end are trimmingly cut as it were, or made more or less true and rectified, in a fashion somewhat analogous to the more positive cutting action of a thread cutting die, and all trimmed off fragments are cleaned out of the threads, dropping or discharging into the channels 17, as the tool is screwed off of the axle end, which thus prepares the threaded axle end for the facile attachment of the securing nut after the wheel has been replaced.

The utility and full advantages of this additionally improved simple tool will be clearly apparent, it is believed, especially to the users of automobiles and the garage or repair man, and having thus fully disclosed the improvements, what we claim, as new and patentable, is:—

1. In a combined wheel remover and thread truing tool, a hard metal stock body having a socket of suitable depth and diameter for properly encompassing a threaded axle end, which socket is internally threaded for a portion of its outer length and terminates at its inner end in a peripherally unobstructed annular chamber that is of greater diameter than said threaded portion and is rearwardly closed by the stock body of the tool, and the said threaded portion being suitably grooved to provide channeling extending therealong to transversely separate the threads thereof, whereby the tool as a unit functions with the successive steps of truing the threads of the axle end, as the tool is applied thereto, and loosening the wheel from its axle by tapping blows upon the tool body.

2. In a combined wheel remover and thread truing tool, a hard metal stock body having a socket of suitable depth and diameter for properly encompassing a threaded axle end, which socket is internally threaded for a portion of its outer length and terminates at its inner end in a peripherally unobstructed annular chamber that is of greater diameter than said threaded portion and is rearwardly closed by the stock body of the tool, the said threaded portion being suitably grooved to provide a plurality of longitudinally disposed channels therealong, to transversely separate the threads thereof, and the said channels being of a greater depth than the depth of said threads and being in open communication at their rear ends with said annular chamber, whereby the tool as a unit functions with the successive steps of truing the threads of the axle end, as the tool is applied thereto, loosening the wheel from its axle by tapping blows upon the tool body, and substantially removing the trimmed off particles of the trued threads as the tool is detached from the axle end.

In testimony whereof, we affix our signatures.

DANIEL S. LAMBERT.
CRANSTON B. RADER.